(12) United States Patent
Bisson et al.

(10) Patent No.: US 7,295,775 B2
(45) Date of Patent: Nov. 13, 2007

(54) METHOD AND A SYSTEM FOR MONITORING THE TRANSMISSION OF OPTICAL SIGNALS

(75) Inventors: Arnaud Bisson, Orsay (FR); Jean-Paul Faure, Paris (FR); Ludovic Noirie, Nozay (FR)

(73) Assignee: Alcatel, Paris (FR)

( * ) Notice: Subject to any disclaimer, the term of this patent is extended or adjusted under 35 U.S.C. 154(b) by 645 days.

(21) Appl. No.: 10/411,312

(22) Filed: Apr. 11, 2003

(65) Prior Publication Data
US 2003/0198469 A1     Oct. 23, 2003

(30) Foreign Application Priority Data
Apr. 18, 2002   (FR)   .................................. 02 04866

(51) Int. Cl.
H04B 10/08     (2006.01)
H04J 14/00     (2006.01)
H04J 14/02     (2006.01)

(52) U.S. Cl. ............................. 398/33; 398/30; 398/43; 398/79; 398/82

(58) Field of Classification Search .................. 398/79, 398/33, 30, 43, 82
See application file for complete search history.

(56) References Cited

U.S. PATENT DOCUMENTS 5,654,816 A    8/1997 Fishman 6,094,442 A * 7/2000 Okamoto et al. ........... 370/506
6,282,005 B1 * 8/2001 Thompson et al. ......... 398/143
6,563,614 B1 * 5/2003 Stephens et al. ............... 398/5

FOREIGN PATENT DOCUMENTS

| EP | 0 782 279 A2 * | 2/1997 |
| EP | 0 782 279 A2 | 7/1997 |
| EP | WO 01/48962 * | 7/2001 |
| WO | WO 0148962 A1 | 7/2001 |
| WO | WO 01/86847 A1 | 11/2001 |

* cited by examiner

Primary Examiner—M. R. Sedighian
(74) Attorney, Agent, or Firm—Sughrue Mion, PLLC

(57) ABSTRACT

The present invention relates to a method of monitoring the transmission of optical signals including a step of inserting a monitoring signal (S) more particularly suited to monitoring the quality of service. During the transmission of optical signals each carried by a predefined wavelength defining a transmission channel ($C_i$), said signals are grouped onto the same fiber in a band (B) of channels. The method then includes a step of simultaneously modulating said signals grouped in the band of channels using the monitoring signal to be transmitted, so that each of the signals constitutes a carrier of the monitoring signal.

10 Claims, 2 Drawing Sheets

METHOD AND A SYSTEM FOR MONITORING THE TRANSMISSION OF OPTICAL SIGNALS

The present invention relates to a method and to a system for monitoring the transmission of optical signals that are more particularly suited to monitoring quality of service.

BACKGROUND OF THE INVENTION

In recent years an enormous demand for bandwidth has been generated by the deployment of modern forms of telecommunication, in particular the Internet and its main application, the World Wide Web, as well as private networks of diverse enterprises and organizations, without forgetting wireless communications, in particular mobile telephones, which in practice requires powerful terrestrial infrastructures if the expectations of customers are not to be disappointed. To face up to this demand, those responsible for providing the networks necessary for the deployment of these new forms of communication have rapidly had to convert to transporting signals carrying information in optical form, in the first place to benefit from the low cost of optical fibers, and in the second place to benefit from the very high bit rates that can be achieved without it being necessary to regenerate the signal, and despite transmission distances that can be measured in kilometers, tens of kilometers, and even hundreds of kilometers. This is because attenuation is very low, especially in monomode fibers, compared to what can be achieved with electrical transmission on copper wires, for example. Moreover, optical transmission avoids all the problems associated with electromagnetic interference, which necessitate costly protection circuits and can lead to frequent transmission errors.

The wavelength division multiplexing (WDM) technique has enabled transmission in the same fiber of a plurality of signals carried by respective different wavelengths, generally in a wavelength window situated around 1550 nm. This increases the number of independent transmission channels associated with the respective carrier wavelengths. In other words, transmitting light waves with different colors makes better use of the portion of the bandwidth of a single fiber. The dense WDM (DWDM) technique, which soon succeeded the WDM technique, can multiplex hundreds of channels, or even more channels.

The proliferation of high added value services has led to the requirement to monitor the quality of service (QoS) offered.

This requires the creation and transmission in the network of control data that can subsequently be detected and analyzed.

A first solution is to create control data on a channel-by-channel basis by separately overmodulating the signal of each channel with control data.

A second solution consists in using a dedicated channel to transmit control data.

However, and especially if the DWDM technique is used, the data to be transmitted over an optical transmission network is organized into bands of wavelengths, i.e. bands of channels, and the various nodes of an optical transmission network communicate by means of entire bands of channels. Thus the requirement to monitor the QoS is manifested on a band-by-band basis. The two solutions referred to above then cause problems.

The first solution involves overmodulating each channel in the same band, and detecting the control data imposes demultiplexing in order to extract the overmodulation from any one channel.

The second solution implies using a dedicated channel for each band to be monitored, and also leads to a very high cost.

OBJECTS AND SUMMARY OF THE INVENTION

The present invention aims to provide a monitoring method constituting a simple and economical way of supervising an optical transmission network and monitoring the QoS band by band.

To this end the present invention proposes a method of monitoring the transmission of optical signals each carried by a predefined wavelength defining a transmission channel, said method including a step of inserting a monitoring signal during the transmission of said optical signals, said signals being grouped onto the same fiber to form a multiplex defining a band of channels, and said method is characterized in that it includes a modulation step consisting in simultaneously modulating said signals of the multiplex of said band of channels as a function of said monitoring signal to be transmitted, so that each of said signals constitutes a carrier of said monitoring signal.

By means of the invention, only one modulation operation is needed to insert the control data that is carried by each of the signals; moreover, the invention can monitor the QoS on a band-by-band basis since the modulation writes the control data directly into the band. The modulation as a function of the monitoring signal representing the binary data to be transmitted for monitoring the QoS is typically frequency modulation or phase modulation of a sub-carrier at a frequency that is low compared to the modulation frequencies of the signals of the multiplex.

It should be noted that because this simultaneous modulation is applied to a plurality of carrier waves with different wavelengths, a problem could arise after transmission in links where the media are subject to chromatic dispersion. In reality, this problem does not arise because most transmission systems using dispersive links generally include chromatic dispersion compensators. Moreover, in the absence of compensation, the frequency of the sub-carrier can always be made sufficiently low to avoid this problem, since the control data does not necessitate a high bit rate.

The method advantageously includes a step of detecting said monitoring signal.

Said detection step is advantageously carried out by detecting said monitoring signal in the modulated multiplex. This is because it may be useful to recover the monitoring signal when the channels are still in the band. Moreover, because all the channels are overmodulated at the same time, synchronization is not necessary.

A variant of the method includes a demultiplexing step using a demultiplexer which receives at its input the modulated multiplex and provides at each of its outputs an optical signal corresponding to a transmission channel and carrying said monitoring signal.

Said detection step is advantageously effected at one or more outputs of said demultiplexer.

It is therefore also possible to recover the monitoring signal on only one of the channels, after splitting the band into different channels, since each of the channels carries the same monitoring signal.

An implementation of the method includes a step of canceling said monitoring signal by suppressing said modulation. This is beneficial in terms of being able to modify the monitoring signal.

The present invention also provides method of adding/dropping a band of channels at a network node enabling a plurality of bands of channels to be transmitted by means of at least one add/drop switch having a first input connected to said network node, a second input for adding a band of channels at said network node, a first output connected to the network node, and a second output for dropping a band at said network node, said method including the following steps:

receiving a band of channels at said first input of said switch, and when a band of channels to be added is received at said second input, transmitting said band of channels from said first input to said second output and said band of channels to be added from said second input to said first output, and then inserting a monitoring signal into said band of channels transmitted to said first output by means of the method according to the invention of inserting a monitoring signal.

Thus the method of the invention is particularly suited to use in a network node architecture with add and drop multiplexing of bands of channels.

In an implementation, the band of channels received at said first input of said switch carries a monitoring signal inserted using the method in accordance with the invention of inserting a monitoring signal.

Finally, the present invention proposes a system for implementing the method of the invention of inserting a monitoring signal, characterized in that it includes means for modulating simultaneously said signals of the multiplex of said band of channels as a function of said monitoring signal to be transmitted so that each of said signals constitutes a carrier of said monitoring signal.

In an embodiment, the modulator means comprise a variable optical attenuator.

The system advantageously includes a multiplexer for grouping into one band of channels on the same fiber optical signals each carried by a predefined wavelength defining a transmission channel.

The system advantageously includes means for detecting said monitoring signal.

In an embodiment, the signal detector means comprise a photodiode.

BRIEF DESCRIPTION OF THE DRAWINGS

Other features and advantages of the present invention become apparent from the following description of an embodiment of the invention, which is given by way of illustrative and non-limiting example.

In the drawings.

MORE DETAILED DESCRIPTION

Items common to both figures are identified by the same reference symbols in both figures.

Figure 1:
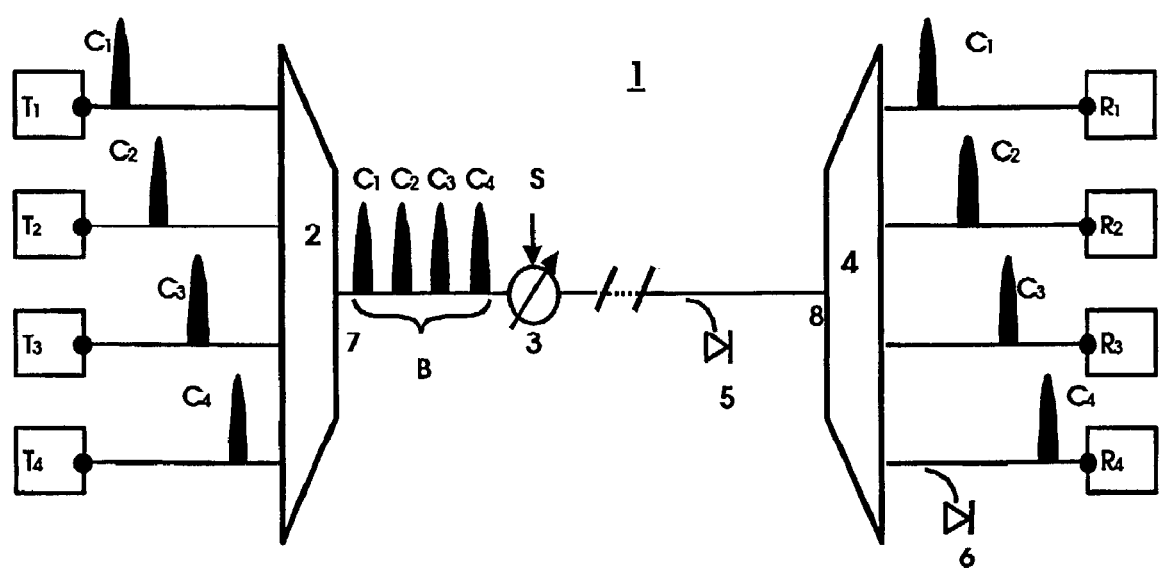
FIG. 1 shows a system for implementing a method of inserting a monitoring signal, in accordance with the invention.

FIG. 1 shows an example of a system 1 for implementing a method of inserting a monitoring signal, in accordance with the invention.

Broadly speaking, the system 1 comprises a multiplexer 2 and a variable optical attenuator 3 on the transmitter side and photodiodes 5 and 6 and a demultiplexer 4 on the receiver side.

In the example shown, the multiplexer 2 has four input ports $(T_i)_{1 \leq i \leq 4}$ and one input port 7 and the demultiplexer 4 has one input port 8 and four output ports $(R_i)_{1 \leq i \leq 4}$.

At respective input ports $(T_i)_{1 \leq i \leq 4}$ the multiplexer 2 receives a plurality of input optical signals. Each input signal takes the form of modulation of a carrier wave having a predefined wavelength defining a transmission channel $(C_i)_{1 \leq i \leq 4}$. The modulation is often amplitude modulation, but can also be optical phase modulation or optical frequency modulation. The modulation is synchronized by a clock defining a bit frequency.

The multiplexer 2 provides at its output 8 a multiplex signal defining a band B of channels including the four channels $(C_i)_{1 \leq i \leq 4}$.

The multiplex is modulated as a function of the monitoring signal representing binary data to be transmitted to monitor the QoS.

The modulation is typically frequency modulation or phase modulation of a sub-carrier at a frequency that is low compared to the bit frequencies of the signals of the multiplex. This modulation is also of low amplitude compared to the amplitude of the input optical signals, for example less than 10% thereof.

The amplitude is modulated by a quality of service monitoring signal S that controls a variable attenuator 3. Thus each of the signals on the channels $(C_i)_{1 \leq i \leq 4}$ serves as a carrier for the signal S.

The subcarrier of the signal S can have a frequency from 10 kHz to 1 MHz, for example, and in all cases a frequency much lower than the modulation frequency of the input signals, which at present is typically of the order of 1 GHz to 10 GHz.

The signal multiplexed and modulated by S can then be transmitted via the optical network (shown diagrammatically in dashed line). The receiver includes a demultiplexer 4 whose input 8 receives the transmitted multiplexed signal. The four channels $(C_i)_{1 \leq i \leq 4}$ each carrying the monitoring signal S are obtained at each of the outputs $(R_i)_{1 \leq i \leq 4}$ of the demultiplexer 4.

The signal S can be detected before or after the demultiplexing step. Thus the photodiode 5 upstream of the demultiplexer 4 detects the signal S before demultiplexing and the photodiode 6 at the output R4 of the demultiplexer 4 detects the signal S after demultiplexing. It is apparent that detection can be achieved equally well from the signals in the B band and in one of the channels $(C_i)_{1 \leq i \leq 4}$, since each of the channels carries exactly the same signal S.

Figure 2:
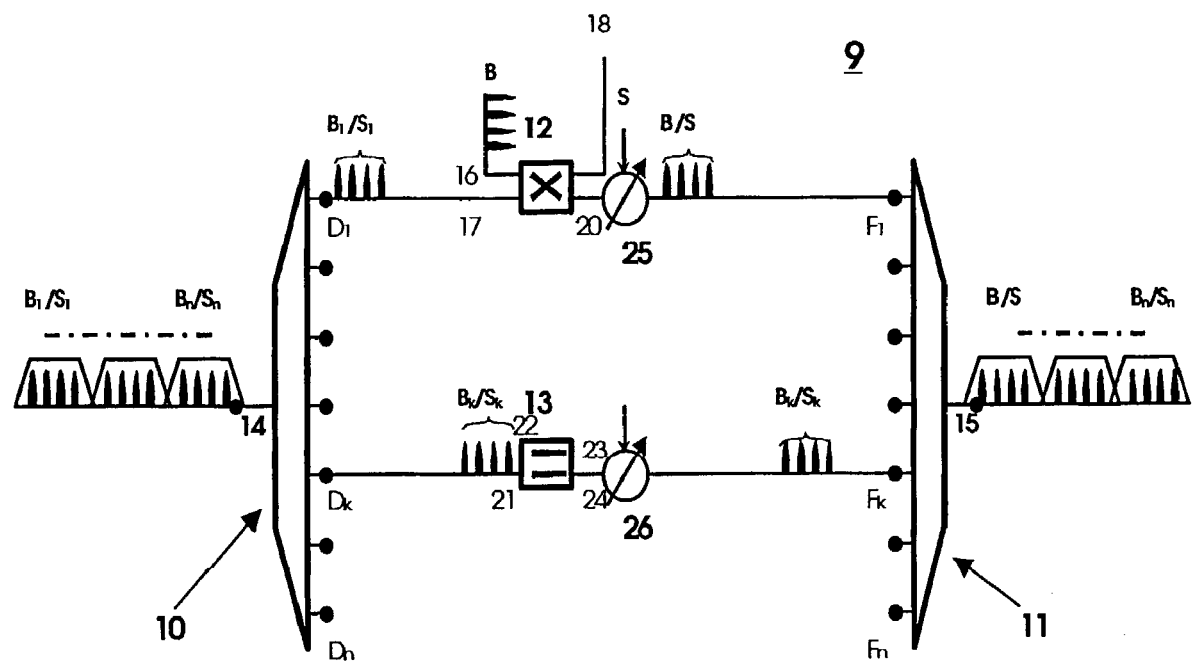
FIG. 2 shows a unit for adding/dropping bands of channels that is part of a network node and uses a method according to the invention.

FIG. 2 shows one example of a unit 9 for adding/dropping bands of channels that is part of a network node that uses a method according to the invention and not all of which is shown.

The unit 9 shown includes a demultiplexer 10, a multiplexer 11, add/drop space switches 12 and 13, and modulators 25 and 26.

The multiplexer 10 has an input 14 and n outputs $(D_i)_{1 \leq i \leq 4}$ and the demultiplexer 11 has n inputs $(F_i)_{1 \leq i \leq 4}$ and one output 15.

The switch 12 has two inputs 16 and 17 and two outputs 18 and 20.

Similarly, the switch 13 has two inputs 21 and 22 and two outputs 23 and 24.

The unit 9 receives at the input 14 of the demultiplexer 10 a signal consisting of a plurality of bands $(B_i)_{1 \leq i \leq 4}$ each including four channels, for example. Each of these bands carries a quality of service monitoring signal $(S_i)_{1 \leq i \leq 4}$. The signals $(S_i)_{1 \leq i \leq 4}$ are inserted into the bands $(B_i)_{1 \leq i \leq 4}$ by the method described with reference to FIG. 1, for example.

The demultiplexer 10 demultiplexes the signal received to each of its outputs $(D_i)_{1 \leq i \leq 4}$. The outputs $(D_i)_{1 \leq i \leq 4}$ each supply a signal in the band $(B_i)_{1 \leq i \leq 4}$ of channels carrying a signal $(S_i)_{1 \leq i \leq 4}$. The following description relates more particularly to the output $D_1$ supplying the signal $B_1$ modulated by the signal $S_1$ and to the output $D_k$ supplying the signal $B_k$ modulated by the signal $S_k$.

The signal $B_1$ modulated by the signal $S_1$ is injected into the input 17 of the switch 12. A signal from the band B to be added in the network node is applied to the input 16 of the switch 17. The switch 12 then operates in crossed propagation mode; the signal from the band B is therefore transmitted to the output 20 of the switch 12 and thus added at the node, whereas the signal in the band $B_1$ modulated by the signal $S_1$ is transmitted to the output 18 and therefore dropped at the node.

The signal from the band B is then modulated by the monitoring signal S in the modulator 25. The signal from the band B modulated by the signal S is then transmitted to the input $F_1$ of the multiplexer 11.

The signal in the band $B_k$ modulated by the signal $S_k$ is injected into the input 21 of the switch 13. However, no signal to be added at the node is present at the input 22 of the switch 13, which thus operates in parallel propagation mode. The signal $B_k$ modulated by the signal $S_k$ is then transmitted to the output 24 of the switch 13 and the output 23 receives nothing.

Two situations can then be envisaged:

Either the signal in the band $B_k$ modulated by the signal $S_k$ is transmitted directly to the input $F_k$ of the multiplexer 11 via the modulator 26, which is inactive. This configuration is shown in FIG. 2.

Or the modulator 26 cancels the modulation of the signal from the band $B_k$ by the signal $S_k$ and applies new modulation to the signal from the band $B_k$, and the newly modulated signal carrying a new monitoring signal is then transmitted to the input $F_k$ of the multiplexer 11. The step of canceling the modulation includes a step of reading the existing modulation and a step that generates modulation complementary thereto and then superposes on the existing modulation the complementary modulation and the new modulation of the signal in the band.

Note that the signal $S_k$ can also dropped and transmitted to the output 23.

Of course, the invention is not limited to the embodiment described above, and any means can be replaced by equivalent means without departing from the scope of the invention.

The invention claimed is:

1. A method of monitoring the transmission of optical signals each carried by a predefined wavelength defining a transmission channel $(C_i)$, said method including a step of inserting a monitoring signal (S) during the transmission of said optical signals, said signals being grouped onto the same fiber to form a multiplex defining a band (B) of channels $(C_i)$, which method is characterized in that it includes, after said multiplex has been formed, a modulation step comprising simultaneously modulating said signals of the multiplex of said band (B) of channels $(C_i)$ as a function of said monitoring signal (S) to be transmitted, so that each of said signals constitutes a carrier of said monitoring signal (S).

2. A method according to claim 1, characterized in that it includes a step of detecting said monitoring signal (S).

3. A method according to claim 2, characterized in that said monitoring signal (S) is detected in said modulated multiplex.

4. A method according to claim 3, including a demultiplexing step using a demultiplexer (4) which receives at its input the modulated multiplex and provides at each of its outputs an optical signal corresponding to a transmission channel and carrying said monitoring signal (S).

5. A method according to claim 4, including a step in which said monitoring signal is detected at one or more outputs of said demultiplexer (4).

6. A method according to claim 1, characterized in that it includes a step of canceling said monitoring signal (S) by suppressing said modulation.

7. A method of adding/dropping a band (B) of channels at a network node enabling transmission of a plurality of bands $(B_j)$ of channels by means of at least one add/drop switch (12) having a first input (17) connected to said network node, a second input (16) for adding a band (B) of channels at said network node, a first output (20) connected to the network node, and a second output (18) for dropping a band at said network node, said method including the following steps:

receiving a band $(B_1/S_1)$ of channels at said first input (17) of said switch (12), when a band (B) of channels to be added is received at said second input (16), transmitting said band $(B_1/S_1)$ of channels from said first input (17) to said second output (18) and said band (B) of channels to be inserted from said second input (16) to said first output (20), and then, by means of the method according to claim 1, inserting a monitoring signal (S) into said band (B) of channels transmitted to said first output (20).

8. An add/drop method according to claim 7, characterized in that, the band $(B_1/S_1)$ of channels received at said first input (17) of said switch (12) carrying a monitoring signal $(S_1)$ inserted by modulation, said method includes a step of canceling said monitoring signal (S) by suppressing said modulation.

9. A system (1) for implementing the method according to claim 1, characterized in that it includes means (3) for modulating simultaneously said signals of the multiplex of said band (B) of channels $(C_i)$ as a function of said monitoring signal (S) to be transmitted so that each of said signals constitutes a carrier of said monitoring signal (S).

10. A system according to claim 9, characterized in that said modulating means (3) comprise a variable optical attenuator (3).

* * * * *